US00H002195H

(19) United States
(12) Statutory Invention Registration
Sisemore

(10) Reg. No.: US H2195 H
(43) Published: Jul. 3, 2007

(54) TECHNIQUE FOR MODELING SHIPBOARD SYSTEMS AND EQUIPMENT

(75) Inventor: Carl L. Sisemore, King George, VA (US)

(73) Assignee: The United States of America as represented by the Secretary of the Navy, Washington, DC (US)

(21) Appl. No.: 10/657,486

(22) Filed: Sep. 8, 2003

(65) Prior Publication Data

US 2005/0052453 A1 Mar. 10, 2005

(51) Int. Cl.
*G06T 17/00* (2006.01)

(52) U.S. Cl. ..... 703/1
(58) Field of Classification Search ..... 114/56.1–63; 703/1–2
See application file for complete search history.

(56) References Cited

U.S. PATENT DOCUMENTS

| | | | | | |
|---|---|---|---|---|---|
| 5,627,949 | A | * | 5/1997 | Letcher, Jr. | 345/420 |
| 5,680,523 | A | | 10/1997 | Watkins et al. | 395/119 |
| 5,841,660 | A | | 11/1998 | Robinson et al. | 364/468.22 |
| 6,317,387 | B1 | * | 11/2001 | D'Amaddio et al. | 367/129 |
| 6,560,498 | B1 | * | 5/2003 | Shin et al. | 700/97 |
| 2002/0019727 | A1 | * | 2/2002 | Cook | 703/2 |
| 2005/0052453 | A1 | * | 3/2005 | Sisemore | 345/420 |

OTHER PUBLICATIONS

Albacore Research Ltd. "ShipConstructor: ShipCAM." Users Manual, Sep. 2001 ed.*

* cited by examiner

*Primary Examiner*—Dan Pihulic
(74) *Attorney, Agent, or Firm*—Gerhard W. Thielman; Marguerite O. Dineen

(57) ABSTRACT

The beam method and the "slice" method for ship modeling are melded. The method uses a detailed ship model in the ship section immediately surrounding the system or equipment under study and a beam model for the portions of the ship away from the detailed ship section. This combined method has the advantage of providing a detailed section of the ship in the area of interest which allows for good system and equipment level modeling, and a course beam model of the ship everywhere else, which, in turn, allows for the ships mass and stiffness and hence frequency spectrum to be accurately represented.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TECHNIQUE FOR MODELING SHIPBOARD SYSTEMS AND EQUIPMENT

FIELD OF THE INVENTION

The present invention relates to enhanced methods for modeling shipboard systems and equipment and more particularly to such a system that involves melding the beam and slice methods of such modeling to obtain more accurate predictive models of these systems and their elements.

BACKGROUND OF THE INVENTION

There are three predominant methods used for the modeling of ships. First a detailed section of a ship can be represented. In this method, essentially, a "slice" out of the ship is modeled in detail and loads and boundary conditions are applied to the ship structure and/or keel surrounding this detailed section of the ship. The primary disadvantage of this method is that the entire ship is not represented in one activation of the model. Therefore, gross ship motions cannot be represented and the ship-wide mass and stiffness are not accounted for. This can lead to incorrect representations in the frequency spectrum.

The second modeling method represents the ship as a beam. This method works fairly well in obtaining gross motions since most ships are significantly longer than they are wide, and thus resemble a beam from a mathematical standpoint. The advantages of this method are that gross ship motions are represented quite well and the ship's actual mass and stiffness can be accounted for leading to good representations in the frequency spectrum. The primary disadvantage of this method is that fine details of the ship cannot be represented. Thus, internal ship spaces and equipment cannot be represented. The way that the beam model is connected to the ship's hull is through a series of stiff connections from the hull to the main beam model of the ship. This series of stiff connections or webs is used to transfer the applied loads from the hull representation to the beam model. This web technique is a fairly typical approach for transferring hull loads to the beam model. Additionally, since the desire has been to represent the internal ship spaces and equipment, the beam method is not sufficient and the ship section does not provide the appropriate ship motions to the modeling and simulation.

The final approach has been to extend the detailed "slice" of the ship to the entire ship, essentially creating a ship model with every ship space contained in the model. This has the significant disadvantage of resulting in mathematical models that cannot be solved on most currently commonly available computer systems. Other disadvantages are the significant amounts of time that are required to build the mathematical model and the fact that shipboard frequencies tend to be "under predicted" using this method.

OBJECTS OF THE INVENTION

It is therefore an object of the present invention to provide a ship modeling method that provides good representation of both the structure of the ship and its contained internal spaces and equipment in the frequency spectrum.

It is another object of the present invention to provide such a system that can be efficiently run on most conventional modeling computers in a reasonable amount of time.

SUMMARY OF THE INVENTION

According to the present invention, the beam method and the "slice" method for ship modeling are melded. The method uses a detailed ship model in the ship section immediately surrounding the system or equipment under study and a beam model for the portions of the ship away from the detailed ship section. This combined method has the advantage of providing a detailed section of the ship in the area of interest which allows for good system and equipment level modeling and a course beam model of the ship everywhere else which, in turn, allows for the ship's mass and stiffness and hence frequency spectrum to be accurately represented.

Similar attempts have been made in the past to incorporate a detailed ship section in a course beam model of a ship, but these attempts have been quite unsuccessful. The methodology with which the coarse beam ship model is connected to the detailed ship section forms the essence of the present invention.

DETAILED DESCRIPTION

In the past when connecting a course model to a detailed model a system of rigid or nearly rigid beams was used to connect a point on the coarse model to the face of the detailed section. For ship models of the type under discussion herein, this would be repeated twice, once for the ship section ahead of the detailed section and a second time for the ship section aft of the detailed section. The difficulty is that when this is done, it does not appear to provide an accurate model of the ship's overall behavior. It results in a model where both coarse models behave appropriately and the detailed section behaves quite poorly.

To correct this problem of connecting the coarse ship to the detailed section, the two coarse sections of the ship are connected to each other by a continuous beam model of the ship. Thus, the beam model of the ship is continuous along the entire length of the ship and, in fact, passes through the detailed "slice" section of the ship. This is entirely possible from a mathematical standpoint since beams can easily pass through plates and bulkheads in the mathematical representation of the model and techniques for such incorporation or "melding" are well known to those skilled in the modeling arts. This has a very significant advantage of having the entire ship behave like a continuous ship. Thus, the whole ship will heave and roll as it should under various kinds of sea and battle loads, specifically in high stress situations such as near miss shock.

The detailed portions of the ship can be "dropped", i.e. inserted or positioned, into the coarse model as such techniques are well known to the skilled artisan familiar with the art of ship and similar modeling techniques. The bulkheads and ship structure surrounding the area of interest are built up from the bull of the coarse model. One of the fundamental differences between this modeling process and those of the prior art is that the beam representing the stiffness of the ship is allowed to pass through the detailed section and the stiff web structure used to connect the beam to the hull is continued throughout the detailed sections. This has the effect of forcing the structure in the volume of the detailed model to behave as part of the overall structure.

There are, of course, some mildly detrimental side effects to this technique. What this technique does is to sacrifice some degree of accuracy in the geometric representation of the ship sections in favor of imposing the correct physical motions on the ship sections. These mild deficiencies are a relatively trivial price to pay for the advantage of actually being able to solve the problem as opposed to the current trend which is to have models that are highly geometrically accurate, but either will not solve on current computer systems or give incorrect results when they do solve.

Figure 1:
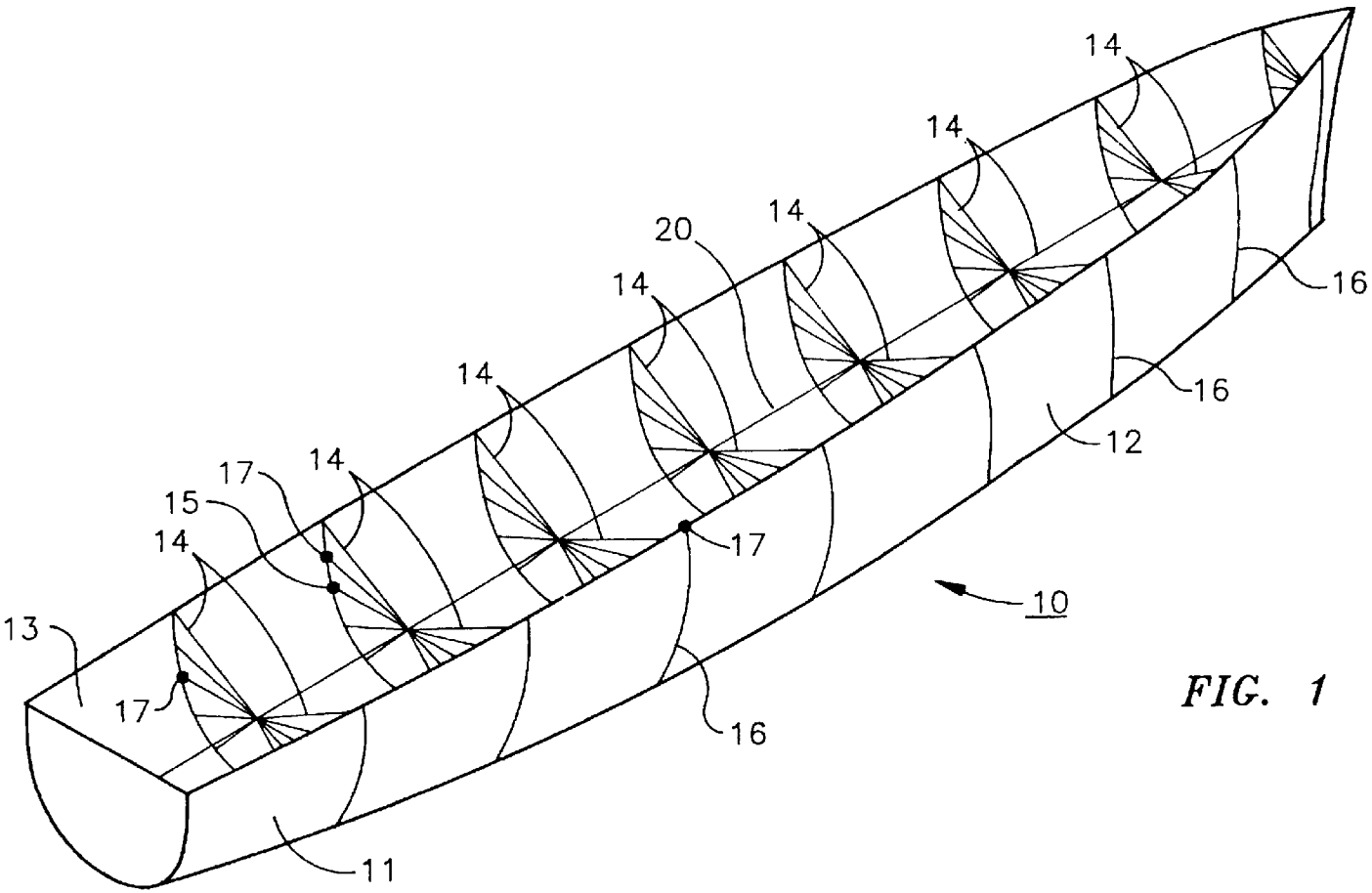
FIG. 1 is a schematic representation of a beam model of a ship.

Referring now to FIG. 1 that depicts a schematic representation of a beam model of a ship 10, the model includes the ship's hull 12 including stiff connections 14 of interior structural members 16 such as bulkheads and the like to hull 12. The model depicted in FIG. 1 represents the coarse beam model referred to hereinabove.

Figure 2:
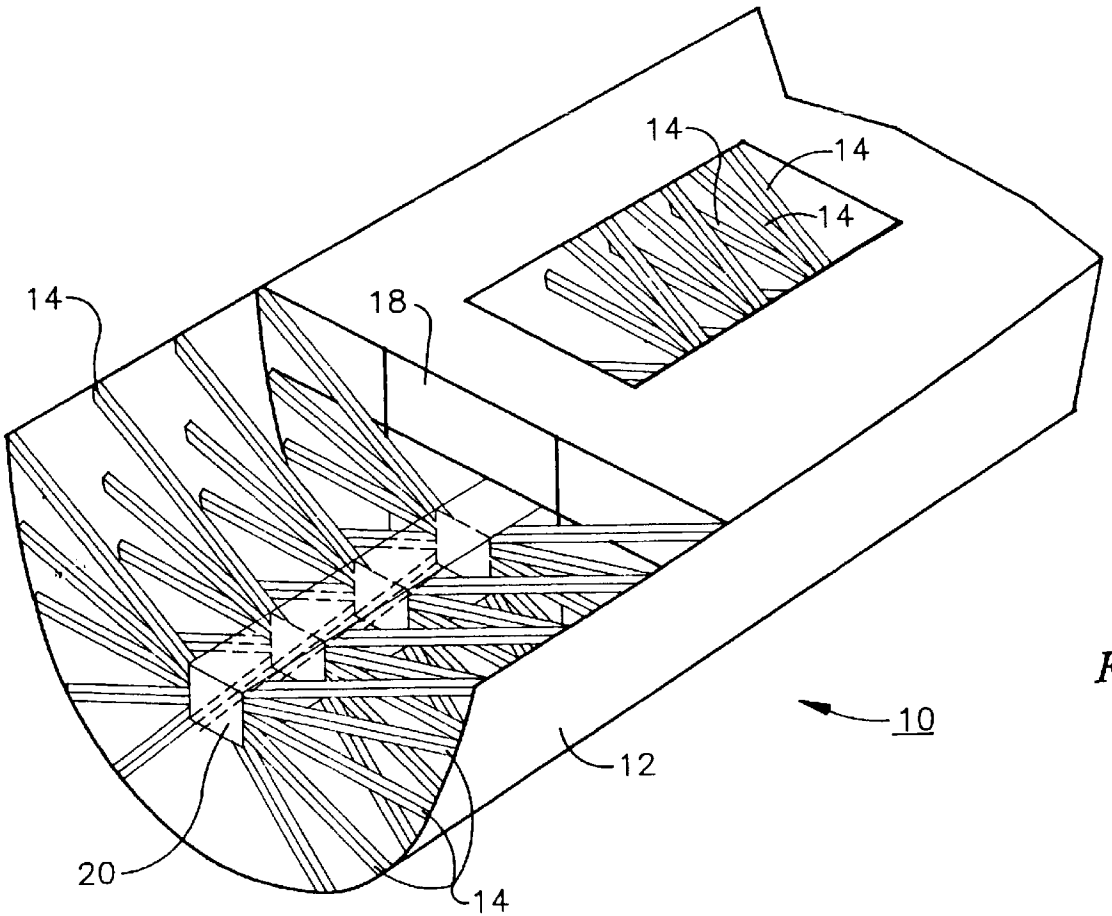
FIG. 2 is a schematic representation of the combined beam and detailed section model of the present invention.

Referring now to FIG. 2 a "slice" model (inset 18) is "dropped into", i.e. inserted into, beam model 10 to permit localized modeling and analysis of the detailed "slice" 18 in the context of the coarse beam model 10.

In the practice of the modeling method described herein, the following describes the process steps utilized to obtained the desired results:

1) A hull model of a ship 12 is produced that comprises essentially a thin shell representing the outer boundaries of the ship including the wet portion 11 and dry portion 13 of the hull;
2) A beam model of the ship is then located within the shell representation of hull 12. This beam model is located such that it runs down the centerline of the ship and is located at a height above the ship's keel corresponding to the location of the ship's center of gravity 20.
3) The beam model of the ship is connected to the thin shell hull model through a series of planar parallel "spider" type connections 14 from the nodes of the beam model to the nodes of the thin shell model at points designated 17 in FIG. 2. These connections are nearly rigid and serve the sole function of translating the hull loadings to the beam model of the ship. The beam model is meant to include all elements that form the integral structure of the ship such as bulkheads, decks, overheads, superstructure, etc.;
4) The beam model is then adjusted to match the approximate mass and stiffness of the overall ship. The mass of the beam is matched to the mass of the ship by adding lumped masses along the length of the beam in approximate proportion to the mass distribution of the ship's structure and equipment as is well known in the ship modeling arts. The stiffness is adjusted by varying the cross-sectional properties of this "hypothetical" ship until the fundamental natural frequencies of the ship are in reasonable agreement. The stiffness and mass distribution of the beam need not be uniform;
5) This "beam" type model of the ship 10 can then be analyzed against test data to evaluate overall ship motions and to make any further adjustments in the model that maybe required, in accordance with conventional modeling practices;
6) The detailed model of the equipment or ship section to be analyzed 18 is then built and "dropped"/inserted into place within the beam model 10 previously constructed and refined as shown in FIG. 2;
7) The detailed section/equipment model 18 needs to contain the equipment of interest as well as any surrounding ship structure, to include decks, bulkheads, overheads, etc. This detailed section should encompass the internals of the ship from the keel all the way up to the weather deck (not shown in the Figures) in that region of the ship represented by detailed section 18. The decks, bulkheads, etc. must be connected to the ship hull model previously constructed at appropriate nodes.
8) The beam model of the ship is left unchanged in that it is allowed to pass through the detailed ship section or "slice" model 18 and the planar parallel "spider" connections 14 from the beam 20 to ship hull 12 are left in place. This compels the detailed ship section 18 to translate in phase with the beam model of the ship 10 and is the essence of the present invention. The only change that should be made to the original beam model 10 is to reduce the added lumped masses along the beam in the region of the detailed section model. Without this reduction, there would be a doubling of mass in the immediate vicinity around the detailed model 18 which would, of course, be unacceptable; and
9) Loading of the ship can be applied through the hull 12 in the case of underwater loading events, such as a mine explosion or some other underwater transient event. In addition, motion can be imposed on the ship beam 20 in the event that it is desired to study the effects of gross ship motions on the equipment or section of interest 18, for example, in the case of high seas or rough seas.

The advantage of this modeling technique is that it actually works and yields results that correlate well to test data. This is in contrast to the ship models using a combination of coarse and detailed sections that have been described above and which in practice do not produce correlatable results. The other principle advantage of this technique is that it allows for smaller models to represent shipboard systems. This in turn allows the models to be solved efficiently using commonly available computing resources. This is in sharp contrast to models being developed in other arenas where an excessive level of detail across the entire ship is attempted to be modeled in a single operation. These highly detailed models are often so large that they cannot be solved on even the largest computer systems currently available.

The novel feature of this modeling method is that ability to successfully integrate the coarse and detailed models so as to yield a model that is both accurate and solvable. It accomplishes this result by effectively overlaying a detailed ship section or "slice" model 18 and a coarse model 10 of the entire ship while correctly imposing the motions of the coarse model 10 on the structure of the detailed or "slice" sections 18.

As the invention as been described, it will be apparent to those skilled in the art that the same may be varied in many ways without departing from the spirit and scope of the invention. Any and all such modifications are intended to be included within the scope of the appended claims.

What is claimed is:

1. A method for structural modeling of a ship including equipment, hull, keel and integral structure, the method comprising:

constructing a thin shell hull model of the ship having cross-sections extending along a longitudinal centerline, the cross-sections defining wet and dry regions, the hull model having a plurality of hull nodes;

constructing a beam model of the ship within the dry region, the beam model having a principal beam that extends along the centerline, the beam model having a plurality of beam nodes;

connecting the principal beam to the hull model through a series substantially rigid rib connections from the beam nodes to corresponding members of the hull nodes;

adjusting the beam model to characterize inertial mass and stiffness of the ship;

constructing a detailed model of a cross-section portion of the ship, the portion extending longitudinally along part of the beam and hull models, the detailed model including nodes that represent equipment, the hull model and the beam model; and replacing the part of the beam model with the detailed model.

2. The method of claim 1 wherein adjusting the beam model further comprises:

adding lumped masses along the beam in approximate proportion to a mass distribution of the ship;

varying cross-sectional and material properties of the model until ship and model natural frequencies of the ship are in substantial agreement; and removing added lump masses along the beam at the detailed model.

* * * * *